United States Patent
Hall et al.

(10) Patent No.: US 10,968,678 B2
(45) Date of Patent: Apr. 6, 2021

(54) AUTOMATED SLIDING PANEL MECHANISM WITH MANUAL RELEASE MECHANISM

(71) Applicant: Hall Labs LLC, Provo, UT (US)

(72) Inventors: David R. Hall, Provo, UT (US); Emily Brimhall, Alpine, UT (US); Austin Carlson, Provo, UT (US); Jerome Miles, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 129 days.

(21) Appl. No.: 16/172,122

(22) Filed: Oct. 26, 2018

(65) Prior Publication Data

US 2020/0131837 A1 Apr. 30, 2020

Related U.S. Application Data

(63) Continuation-in-part of application No. 15/945,935, filed on Apr. 5, 2018, now Pat. No. 10,718,150,
(Continued)

(51) Int. Cl.
*E05F 11/34* (2006.01)
*E05F 15/635* (2015.01)
(Continued)

(52) U.S. Cl.
CPC ........... *E05F 15/635* (2015.01); *F16H 19/04* (2013.01); *E05F 15/70* (2015.01);
(Continued)

(58) Field of Classification Search
CPC ........ E05F 15/635; E05F 15/70; F16H 19/04; F16H 2019/046; E05Y 2900/148; E05Y 2900/132
(Continued)

(56) References Cited

U.S. PATENT DOCUMENTS 4,541,202 A * 9/1985 Dockery ............... E05F 15/635
49/362
5,355,624 A * 10/1994 Bacon ................... E05F 15/635
49/280
(Continued)

FOREIGN PATENT DOCUMENTS

DE  102012107102 A1 * 2/2014 ........... A47C 20/046
DE  102014100444 A1 * 7/2015 ............ A61G 13/06
(Continued)

*Primary Examiner* — Jerry E Redman (57) ABSTRACT

An automated sliding panel mechanism is disclosed. An automated sliding panel mechanism includes a motor attached to a first component of a sliding panel that is configured to move the sliding panel between a closed position and an open position. The mechanism also includes a power source and a rack attached to a second component of the sliding panel and including a base with rack teeth extending from a plane thereof. A gear is rotated by the motor and has gear teeth shaped to mesh with the rack teeth. A manual release mechanism is adapted to move the gear along its axis of rotation, from an engaged position, wherein the gear teeth mesh with the rack teeth to a released position, wherein the gear teeth are disengaged from the rack teeth. The manual release mechanism also includes a holding mechanism adapted to hold the gear in the engaged position and in the released position as selected by a user.

20 Claims, 8 Drawing Sheets

Related U.S. Application Data which is a continuation-in-part of application No. 15/867,431, filed on Jan. 10, 2018, and a continuation-in-part of application No. 15/822,394, filed on Nov. 27, 2017, now Pat. No. 10,822,857.

(60) Provisional application No. 62/528,288, filed on Jul. 3, 2017.

(51) Int. Cl.
  *F16H 19/04* (2006.01)
  *E05F 15/70* (2015.01)

(52) U.S. Cl.
  CPC ... *E05Y 2900/132* (2013.01); *E05Y 2900/148* (2013.01); *F16H 2019/046* (2013.01)

(58) Field of Classification Search
  USPC .......................... 49/358, 360, 362, 138, 139
  See application file for complete search history.

(56) References Cited

U.S. PATENT DOCUMENTS

| | | | | |
|---|---|---|---|---|
| 5,440,837 | A * | 8/1995 | Piltingsrud | E05D 15/22 49/139 |
| 5,605,013 | A * | 2/1997 | Hogston | E05F 15/673 49/31 |
| 5,634,298 | A * | 6/1997 | Slopack | E05F 15/75 49/360 |
| 5,680,729 | A * | 10/1997 | Heffington | E05F 15/53 49/362 |
| 5,687,506 | A * | 11/1997 | Davies | E05D 15/0604 49/260 |
| 5,826,377 | A * | 10/1998 | Simson | E05D 15/0656 49/362 |
| 5,893,242 | A * | 4/1999 | Perron | E05F 11/36 52/202 |
| 6,343,436 | B1 * | 2/2002 | Milano, Jr. | E05F 15/67 49/362 |
| 6,722,517 | B1 * | 4/2004 | Steeber | B65D 45/025 220/251 |
| 6,807,775 | B2 * | 10/2004 | Hoare | E05F 15/638 474/133 |
| 7,607,365 | B1 * | 10/2009 | Courser | B60P 3/34 296/171 |
| 7,856,758 | B2 * | 12/2010 | Ressel | E05F 15/676 49/199 |
| 9,003,708 | B2 * | 4/2015 | Shiroma | F16H 19/04 49/362 |
| 9,725,941 | B2 * | 8/2017 | Van Tassell, III | E05F 15/641 |
| 9,970,225 | B2 * | 5/2018 | Wynder | E05D 15/16 |
| 2001/0027621 | A1 * | 10/2001 | Davies | E06B 3/50 49/360 |
| 2004/0244295 | A1 * | 12/2004 | Derham | E05F 15/41 49/362 |
| 2008/0163553 | A1 * | 7/2008 | Liao | E05F 15/689 49/362 |
| 2008/0184623 | A1 * | 8/2008 | Heigl | E05F 15/659 49/31 |
| 2012/0198773 | A1 * | 8/2012 | Younce | E06B 11/026 49/359 |
| 2012/0297683 | A1 * | 11/2012 | Cavalcante | E05F 15/635 49/358 |
| 2013/0119700 | A1 * | 5/2013 | Garceau | F16H 55/26 296/175 |
| 2014/0259930 | A1 * | 9/2014 | Gilliam | E06B 11/026 49/70 |
| 2015/0267456 | A1 * | 9/2015 | Shih | E05F 15/57 49/349 |
| 2016/0130852 | A1 * | 5/2016 | Choi | F16H 19/04 49/404 |
| 2016/0326789 | A1 * | 11/2016 | Ando | E05F 15/635 |
| 2016/0356069 | A1 * | 12/2016 | Choi | F16H 19/04 |
| 2017/0028898 | A1 * | 2/2017 | Garceau | F16H 35/18 |
| 2018/0003274 | A1 * | 1/2018 | Lim | F16H 55/20 |
| 2018/0023333 | A1 * | 1/2018 | Lange | E05D 13/1207 49/349 |
| 2018/0238097 | A1 * | 8/2018 | Plummer | E05F 15/652 |
| 2019/0003235 | A1 * | 1/2019 | Hall | E05F 15/635 |
| 2019/0003236 | A1 * | 1/2019 | Hall | E05F 15/635 |
| 2019/0040671 | A1 * | 2/2019 | Hall | E05F 15/79 |
| 2019/0162007 | A1 * | 5/2019 | Hall | E06B 3/46 |
| 2019/0162009 | A1 * | 5/2019 | Hall | H02K 7/1166 |
| 2019/0277077 | A1 * | 9/2019 | Ben-Arie | E05F 11/40 |
| 2019/0309559 | A1 * | 10/2019 | Hall | E05F 15/40 |
| 2019/0309561 | A1 * | 10/2019 | Hall | E05F 15/73 |
| 2019/0309562 | A1 * | 10/2019 | Hall | E05F 15/71 |
| 2019/0360254 | A1 * | 11/2019 | Cavarec | E05F 15/643 |

FOREIGN PATENT DOCUMENTS

| | | | | |
|---|---|---|---|---|
| DE | 202018001609 U1 * | 4/2018 | ............ | E05F 15/652 |
| FR | 2853683 A1 * | 10/2004 | ............ | E05F 15/635 |
| GB | 920364 A * | 3/1963 | ............ | B05B 9/0838 |
| WO | WO-2018181905 A1 * | 10/2018 | ............ | B60R 7/06 |

\* cited by examiner

AUTOMATED SLIDING PANEL MECHANISM WITH MANUAL RELEASE MECHANISM

CROSS-REFERENCE TO RELATED APPLICATIONS

This application is a continuation in-part of U.S. patent application Ser. No. 15/945,935, now U.S. Pat. No. 10,718,150 filed Apr. 5, 2018 and entitled Gear-Driven Automated Window or Door System, which is, in turn, a continuation-in-part of U.S. patent application Ser. No. 15/867,431, filed Jan. 10, 2018 and entitled Motorized Gear Sliding Window or Door System, which is, in turn, a continuation-in-part of U.S. patent application Ser. No. 15/822,394, now U.S. Pat. No. 10,822,857 filed Nov. 27, 2017 and entitled Retrofittable Motorized Gear Sliding Window or Door System, which is, in turn, a continuation-in-part of U.S. Provisional Patent Application No. 62/528,288, filed Jul. 3, 2017 and entitled Retrofittable Motorized Gear Sliding Window The entire disclosures of which are incorporated herein by reference.

TECHNICAL FIELD

This invention relates generally to smart home devices and specifically to automated sliding panels.

BACKGROUND

Many improvements and developments have been made in the field of smart home devices. However, many devices, especially existing devices in a residence or business (such as windows, window coverings and doors, for example), simply were not designed or configured to be smart.

Traditionally, windows are opened and closed manually for ventilation, energy or security or safety needs. For example, a window or door may be closed and locked while the owners are away from home to protect the home from entry by an intruder. A window or door may be opened in order to vent noxious gases from the interior of the home to the outside. When the inside of the house is hot, a door or window may be opened to allow cooler outside air to enter the house.

In order to enable these traditional functions to be carried out in an automated smart system, motorized devices are needed to open and close the windows or doors.

SUMMARY

In a first aspect, the invention is an automated sliding panel mechanism including a motor attached to a first component of a sliding panel that is configured to move the sliding panel between a closed position and an open position. It includes a power source, a rack attached to a second component of the sliding panel, a base with rack teeth extending from a plane thereof, and a gear rotated by the motor including gear teeth shaped to mesh with the rack teeth. The invention also includes a manual release mechanism that is adapted to move the gear along its axis of rotation from an engaged position, wherein the gear teeth mesh with the rack teeth, to a released position, wherein the gear teeth are disengaged from the rack teeth. The invention further includes a holding mechanism adapted to hold the gear in the engaged position and in the released position as selected by a user.

In a second aspect, the disclosure provides a first and a second magnet mounted on a stationary part of the holding mechanism and a third magnet mounted on the manual release mechanism. When the third magnet is brought near and attracts the first magnet, the holding mechanism holds the gear in the engaged position. When the third magnet is brought near and attracts the second magnet, the holding mechanism holds the gear in the released position.

In a third aspect, the disclosure provides a first and a second magnet mounted on the manual release mechanism and a third magnet mounted on a stationary part of the holding mechanism. When the first magnet is brought near and attracts the third magnet, the holding mechanism holds the gear in the engaged position. When the second magnet is brought near and attracts the third magnet, the holding mechanism holds the gear in the released position.

In another embodiment, the invention includes gearing between the motor and the gear. The gearing is configured to prevent rotation of the gear when not driven by the motor. Further, the invention includes a brake to prevent the gear from rotating and thereby locks the sliding panel when the manual release mechanism is in the engaged position except by rotation of the gear by the motor.

In yet another embodiment, the invention includes a surface, in one embodiment a plate, which is moved by a user to move the automated sliding panel mechanism between an engaged position and a released position. Further, the manual release mechanism plate includes indicia which indicates in which direction a user should move the manual release mechanism such that the automated sliding panel mechanism is released or engaged. In another configuration, the manual release mechanism comprises a lever instead of a plate, which is moved by a user to move the automated sliding panel mechanism between an engaged position and a released position. Additionally, the manual release mechanism comprises a carriage, and in one example the manual release mechanism carriage and plate are one piece. In another example, they are attached to each other by means of screws.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

As used herein, "manual" is meant to refer to being done with or by hands, as opposed to automatically or electronically.

As used herein, "carriage" is meant to refer to a means of conveyance, in particular a moving part of a machine that carries other parts into the required position.

It is useful to be able to open a window without having to do so manually. In many buildings, however, windows are not typically equipped with technology to open them automatically. This may be because it is expensive to build a building with automatic windows, or because automatic windows are a relatively new development. Buildings that are comparatively old are not equipped with such technology.

Furthermore, an individual may wish to open a window to facilitate a draft. There are several reasons for which an individual might wish to have a draft blow into a building through a window—which building may be a home, an office building, a doctor's office, or a school. For example, during summer, many areas become extremely warm. A draft helps to cool down a building. Additionally, many people use air conditioners to cool, that is lower the temperature, of a building. However, air conditioning can be very expensive, and, whenever possible, many individuals wish to cool an area alternatively. Opening windows to allow for a draft to enter a building is one way of cooling an area. In addition to providing a cooling effect, a draft may be pleasant and provide fresh air wherein a building or room has become congested or stuffy. A draft can also help to alleviate strong or unpleasant odors which may be in a building or room. Because a draft helps to cool a room, reduce the expense of using air conditioning to cool a room, revive or freshen the air in a room, and alleviate unpleasant odors, many individuals choose to open their windows to allow a draft to pass through. However, it is often the case that a draft occurs when a user is not in a building, or when an individual is sleeping or otherwise occupied. Additionally, when an individual is inside a building, it is difficult or sometimes impossible to know if there is a draft outdoors. Furthermore, an individual may wish to open or close a window when there is a draft but be busy with work or a task, and find it inconvenient or impossible to leave their work or task to open or close a window. For these reasons, again, it useful and beneficial to have a window automated such that it can open or close a window when there is a draft.

In addition, a user may want to automate the opening and closing of windows in a building regardless of whether or not a draft is present. This may be to provide a cooling effect in a room or building, to allow some fresh air into the building, or to improve hearing of outside noises. Regardless, there are many reasons for which an individual might wish to automate the opening and closing of a window or windows. Wherein a window is automated by means of a gear driven by a motor along a rack, a user cannot manually open and close the window with ease. This is due to prevention of backdriving, wherein a gear box comprises gearing that makes the manual driving of a gear difficult. Backdriving a gear that is equipped with gearing causes damage to the gear box and motor. As such, the motor must drive the gear, and is controlled by a controller.

In spite of this, there are instances in which a user needs to open an automated window immediately. This may require that the individual open the window manually, that is, without the use of a controller or motor. For instance, if there is a fire. If a building is on fire, occupants need to escape immediately. Sometimes, the only exit route or most convenient exit route is a window. Wherein a window is equipped with an automated sliding panel mechanism, it may take too long for the sliding panel or window to open via the motor, or the motor or other parts of the mechanism may have become damaged by smoke or fire thus rendering the mechanism incapable of functioning. Under these circumstances, it is needful that a user is able to disengage the gear from the rack, such that they can open the window themselves and escape the building.

A similar emergency may occur with flooding. If a building is flooding and the automated sliding panel mechanism opens the window too slowly, or has become damaged and no longer functions, a user would need to disengage the gear from the rack and open the window manually.

Furthermore, a user may need to open a window equipped with the automated sliding panel mechanism wherein the controller, which is used to move the sliding panel into an open or closed position, is broken, has run out of battery power, or not functioning. For example, in one embodiment the controller is a smart device running an app. Often, smart devices run out of battery or get lost. In these situations, a user may not want to wait to find or charge their smart device in order to operate their automated sliding panel mechanism. If it is very hot, a user may need to open their window immediately. As such, it is useful for the automated sliding panel mechanism to have a release mechanism such that a user can manually engage it and move the window to an open or closed position at their discretion.

A sliding panel may be a door, window, or louver. In a preferred embodiment, the sliding panel is a window. A sliding window is comprised of several components. Firstly, a frame which provides structure and is attached to the other components. The frame comprises a first vertical member and a second vertical member, as well as a first and second horizontal member. Secondly, a stationary component such as a first pane composed of glass or plastic and thirdly a sliding component such as a second pane composed of glass or plastic, both of which are disposed within the frame. Additionally, a channel through which the sliding component slides is attached to the frame. The components of a sliding window may be arranged such that the sliding component moves horizontally or vertically. For example, in one embodiment, the sliding component slides from a lower position to an upper position, or from an upper position to a lower position. As such, the channels allowing the sliding component to slide are positioned in a first vertical member and second vertical member. Alternatively, the sliding component slides from a first side to a second side, such as a left position to a right position, or a right position to a left position, and the channels are situated in the first and second horizontal members of the frame.

In a preferred embodiment, the automated sliding panel mechanism comprises a gear assembly. The gear assembly comprises the manual release mechanism, the holding mechanism, the gear, the motor, a carriage, a gearbox, and a housing comprising a front housing and back housing. The manual release mechanism is comprised of a manual release mechanism surface and the carriage. The manual release mechanism surface may be a plate. The plate, in a preferred embodiment, is a thin piece of plastic. However, in other embodiments, the plate may be metal. In a preferred embodiment, the plate includes indicia indicating to a user in which direction they need to move the plate in order to engage or release the manual release mechanism. In one embodiment, the indicia are drawings. Alternatively, the indicia are words or letters. In yet another embodiment, the indicia is a combination of words and drawings. Furthermore, the manual release mechanism surface may be a lever. Wherein the manual release mechanism surface is a lever, it is also attached to the carriage and is moved between an upper position and lower position to engage or release the gear from the rack. The manual release mechanism surface is attached to the carriage, which surrounds the gear motor—comprised of the gear box and motor—and the gear, such that when the manual release mechanism surface is manually moved by a user, the carriage is lifted and in turn lifts the gear box and motor, and the gear is lifted along its axis such that it no longer meshes with the rack. Then, a user can manually open or close the sliding window with relative ease.

The holding mechanism is comprised of the gear assembly front housing and three magnets. In one embodiment, the magnets are arranged such that the first and second magnets are attached to the manual release mechanism carriage, and the third magnet is attached to the gear assembly front housing—which housing is stationary. Alternatively, the first and second magnets are attached to the gear assembly housing, and the third magnet is attached to the manual release mechanism carriage. Further, the magnets may be disposed such that the first and second magnet are attached to the manual release mechanism carriage with the south ends of the magnets facing towards the gear assembly housing, and the third magnet is attached to the gear assembly housing with the north end facing the first and second magnet. Or, in another embodiment, the first and second magnet are attached to the manual release mechanism carriage with the north ends facing the third magnet, and the third magnet is attached to the gear assembly housing, such that the south end faces the first and second magnet. Alternatively, the first and second magnet are attached to the gear assembly housing and disposed such that the south ends of the magnets face towards the third magnet, while the third magnet is attached to the manual release mechanism carriage and disposed such that the north end faces the first and second magnet. Or, in another embodiment, the first and second magnet are attached to the gear assembly housing and disposed such that the north ends of the magnets face towards the third magnet, while the third magnet is attached to the manual release mechanism carriage and disposed such that the north end faces the first and second magnet. Preferably, all magnets are permanent magnets. However, in alternative embodiments, the magnets are electromagnets.

It is useful to protect the motor from backdriving, as this can cause damage to the automated sliding panel mechanism and protect a user from outside intruders. For example, a user may wish to partly open a window in order to allow a breeze, but wish to keep the opening small enough that a thief, burglar, or other intruder would be unable to fit through the window opening. By including gearing and brakes, an individual would most likely be unable to manually open a window with the automated sliding panel mechanism while the gear is engaged with the rack. However, as mentioned above, there are instances wherein a user needs to manually open a window equipped with the automated sliding panel mechanism, and for this reason, the manual release mechanism is included. By disengaging the gear from the rack, no back driving takes place, and the motor is not damaged by the window being opened manually. Preferably, the gear box includes gearing that makes it difficult to back drive the gear. A brake provides additional support such that the gear cannot be driven except by the motor. In one embodiment, the brake is an electro-magnetic brake, such that when power is supplied to the motor, the brake is released.

Figure 1:
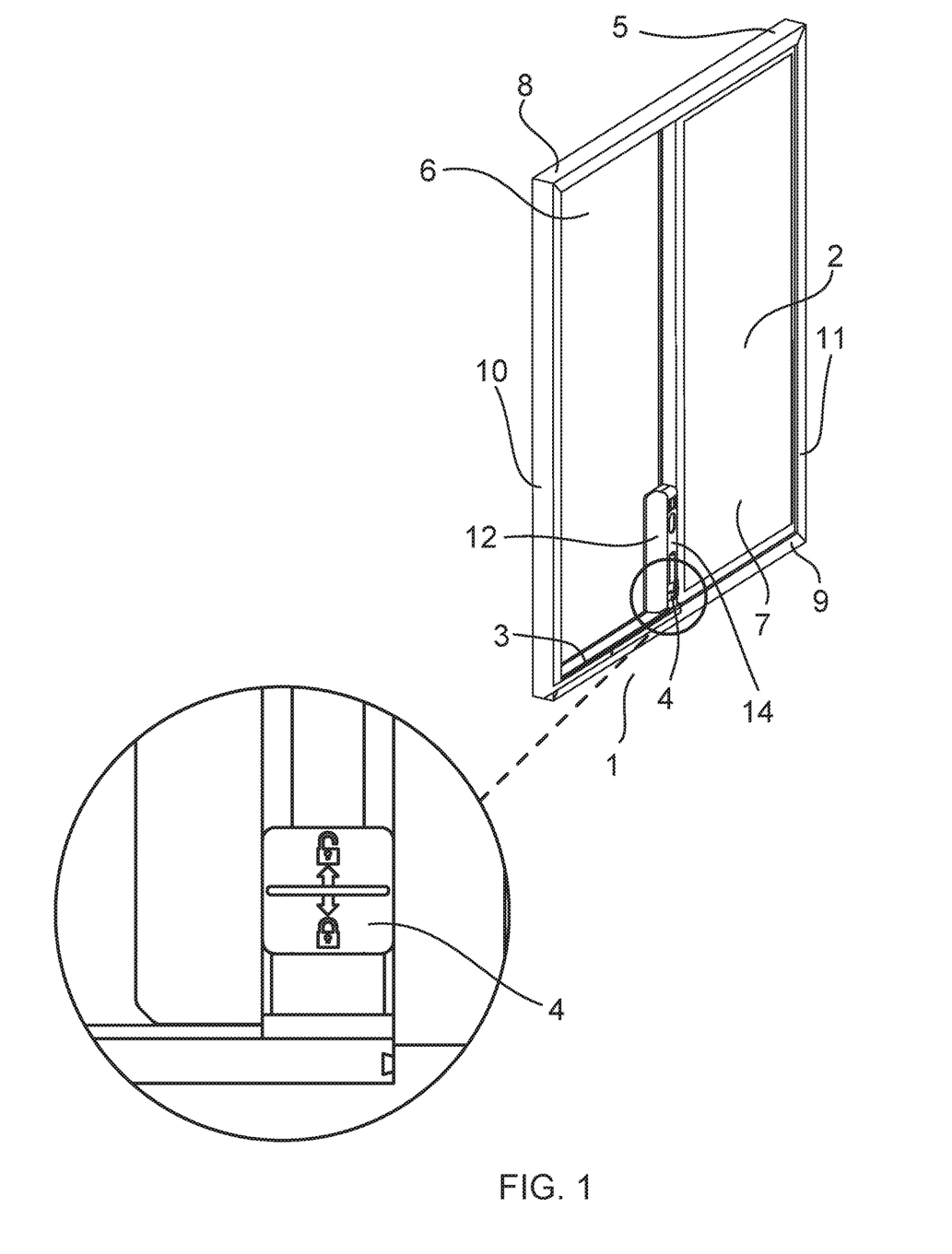
FIG. 1 is a perspective view with an enlarged portion showing the automated sliding panel mechanism with manual release mechanism attached to a sliding window.

Now referring to FIG. 1, an automated sliding panel mechanism 1 is shown attached to a sliding window 2. In this figure, the window sliding component 7 slides from the right to the left, or from the second side to the first side. As such, the rack 3 is attached to the second horizontal member 9 on the side closest to the first vertical member 10 of the frame 5. However, in other embodiments, the window sliding component 7 slides from the right to the left, or from the first side to the second side. In this example, the rack 3 is attached to the second horizontal member 9 on the side closest to the second vertical member 11 of the frame 5. Alternatively, the rack may be attached to the first horizontal member 8 of the frame 5, or the upper portion of the frame 5. For example, wherein a sliding window 2 is configured such that the sliding component 7 slides from the left to the right (as seen in FIG. 1), the rack 3 may be attached to the first horizontal member 8 on the side closest to the first vertical member 10 of the frame. In an embodiment wherein the sliding component 7 of the sliding window slides from the right to the left, the rack 3 may be attached to the first horizontal member 8 on the side closest to the second vertical member 11 of the frame 5. The gear assembly 14 includes the manual release mechanism 4, which in this embodiment, is a plate with indicia in the form of arrows and locks. The arrow pointing upwards is situated beneath an unlocked lock, indicating to a user that to shift the plate of the manual release mechanism 4 upwards will disengage the automated sliding panel mechanism. The arrow pointing downwards is situated above a locked lock, indicating to a user that shifting the plate of the manual release mechanism 4 downwards will lock the automated sliding panel mechanism into an engaged position. In this embodiment, a solar panel 12 is attached to the gear assembly 14.

The solar panel 12 comprises a photovoltaic portion to convert sunlight into electricity. When the solar panel 12 is attached to the gear assembly 14, the photovoltaic portion is facing outside. The back of the gear assembly 14 is comprised of two lips, an upper lip and a lower lip, wherein the solar panel 12 is configured such that it can slide between the lips of the gear assembly 14. The upper and lower lip on the gear assembly 14 permit the solar panel to attach to the gear assembly 14 from either side. As such, if a window opens from left to right or from right to left, a user can attach the solar panel 12 to the gear assembly 14.

Figure 2:
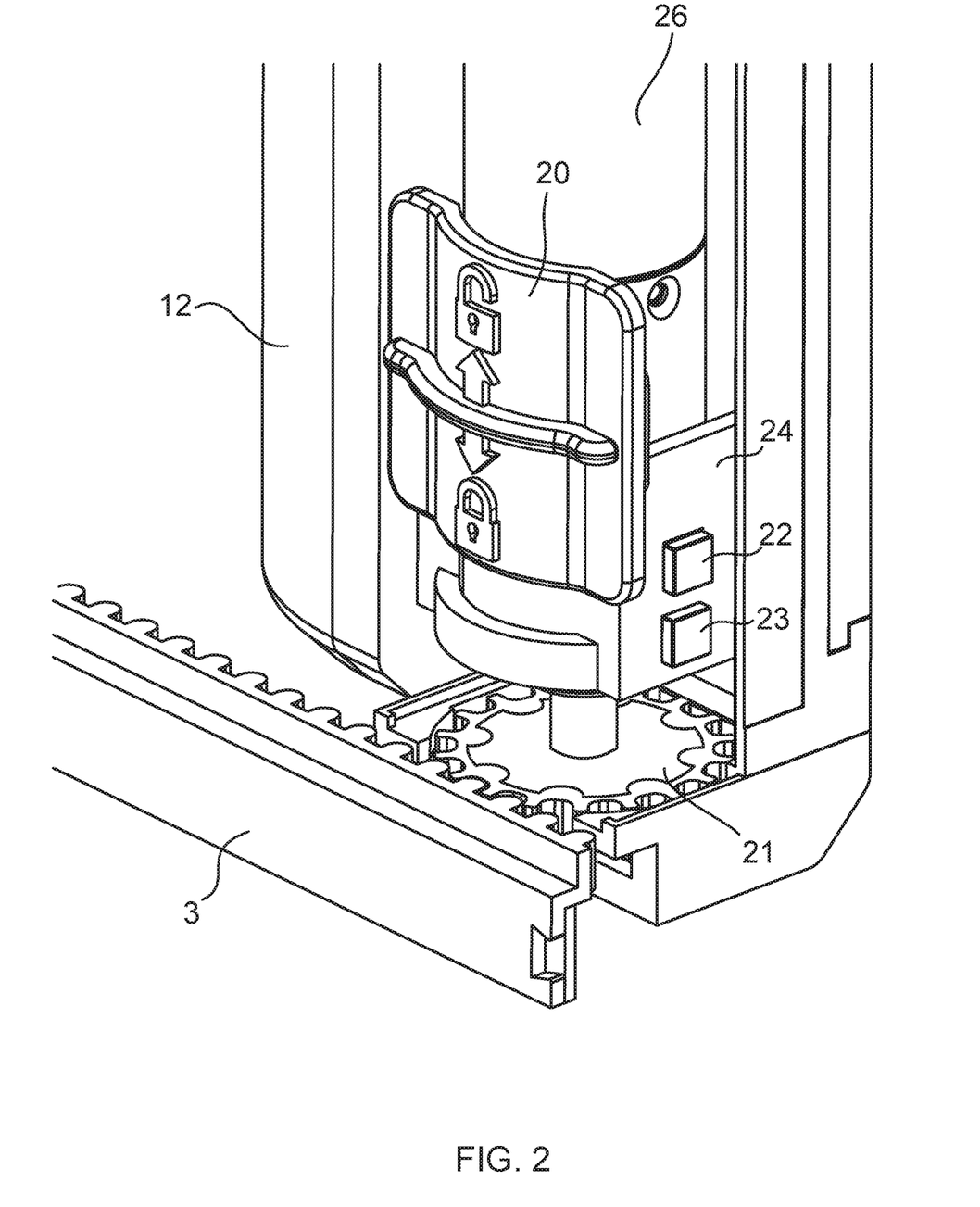
FIG. 2 is a perspective view of the gear assembly and rack.

FIG. 2 depicts the inner workings of the gear assembly 14. The gear 21 is seen meshed with the rack 3. The manual release mechanism plate 20 is connected to the carriage 24 of the manual release mechanism 4. In a preferred embodiment, the manual release mechanism plate 20 is screwed into the carriage 24. However, in other embodiments it is glued or welded to the carriage 24. The carriage 24 surrounds the gear box 25 and motor 26. As such, as a user lifts or lowers the manual release mechanism plate 20, the carriage 24 is simultaneously lifted or lowered, and the gear box 25, motor 26, and gear 21 are also lifted or lowered. In this embodiment, the holding mechanism, comprising a first magnet 22 and a second magnet 23, are attached to the carriage 24.

Figures 3A, 3B, 3C:
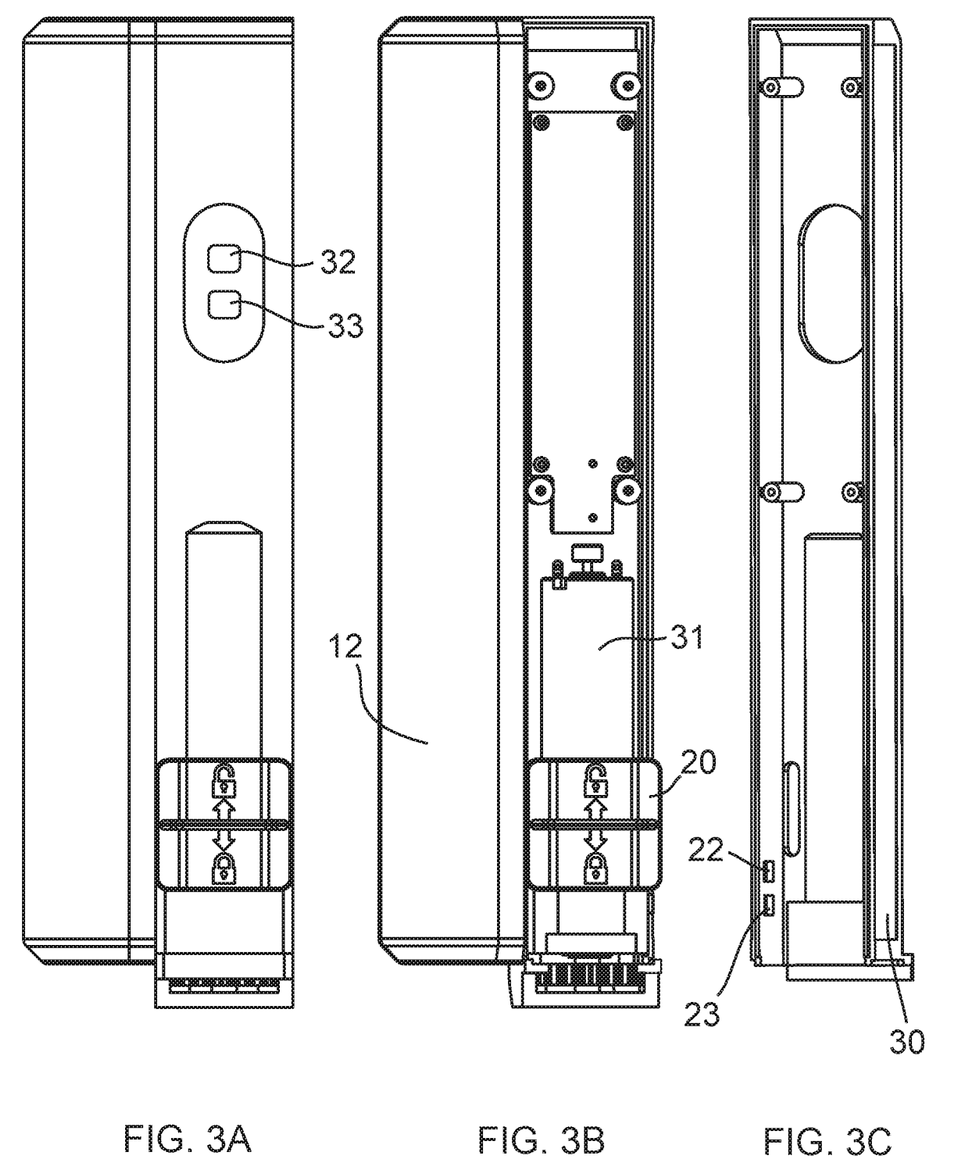
FIG. 3A is a front view of the gear assembly and solar panel.
FIG. 3B is a perspective view of the gear assembly with the front housing detached.
FIG. 3C is a perspective view of the front housing of the gear assembly detached from the gear assembly, comprising two magnets.

FIG. 3A is a front view of the gear assembly 14 and the solar panel 12. In this figure, the gear assembly 14 comprises two buttons that allow a user to open or close the sliding window 2. A first button 32 moves the sliding component 7 to an open position, and a second button 33 moves the sliding component 7 to a closed position. In other embodiments, pressing the button 32 quickly fully opens the sliding component 7, while holding the first button 32 causes the sliding component 7 to open incrementally. Alternatively, rapidly pressing the closing button 33 causes the sliding component 7 to shut completely, while holding the closing button 33 causes the sliding component 7 to close incrementally.

FIG. 3B shows the gear assembly 14 with the front housing 30 removed. FIG. 3C shows the detached front housing 30. The front housing 30 of the gear assembly 14, in this embodiment, comprises the first magnet 22 and second magnet 23 of the holding mechanism. The front housing 30 and first and second magnets are the stationary part of the holding mechanism. As such, in this example, the third magnet of the holding mechanism is attached to the carriage 24 of the manual release mechanism 4, and is movable.

Figure 4A:
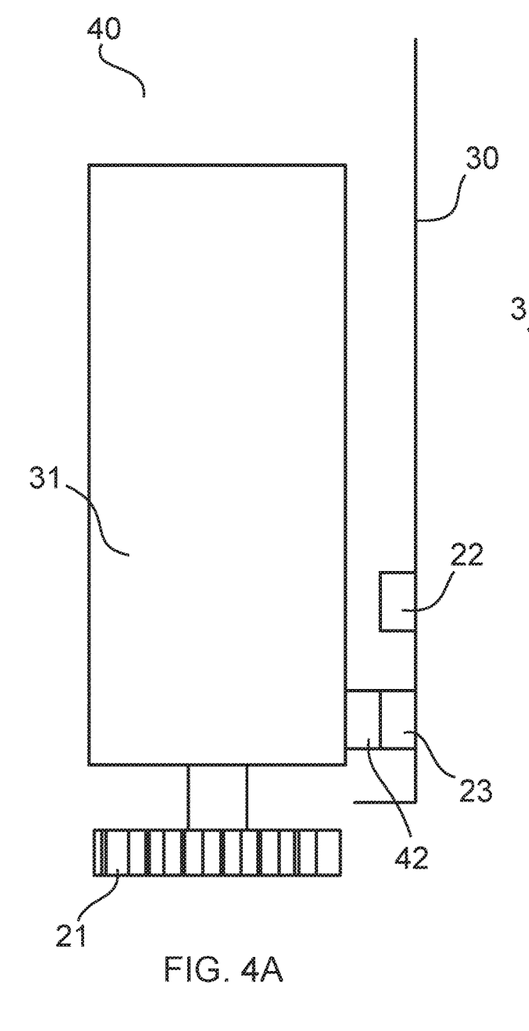
FIG. 4A is a simplified view of the automated sliding panel mechanism in an engaged position.
Figure 4B:
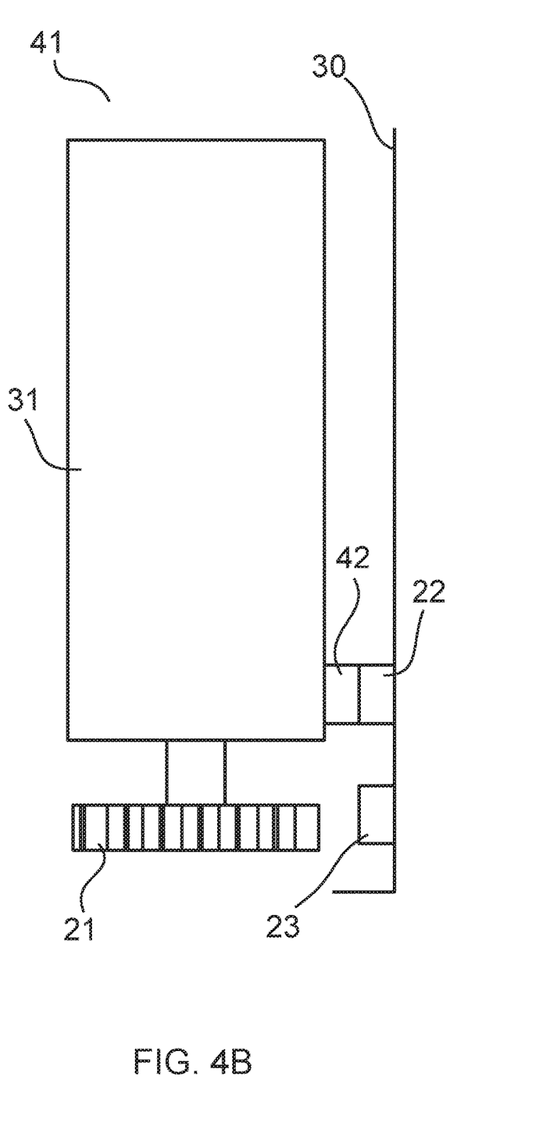
FIG. 4B is a simplified view of the automated sliding panel mechanism in a released position.

FIG. 4A depicts a simplified version of the holding mechanism. The gear box 31 is shown without the manual release mechanism plate 20 or the carriage 24, but is still attached to the gear 21. In FIG. 4A, the automated sliding panel mechanism 1 is in an engaged position 40, such that the gear 21 would be meshed with the rack 3 (as seen in FIG. 2), the second magnet 23 is connected to the third magnet 42, and backdriving would not be possible. In an engaged position 40, a user would have to use the motor of the automated sliding panel mechanism 1 to open or close the sliding window 2. That is to say, backdriving is very difficult wherein the gear 21 is meshed with the rack 3. This is due to the gearing in the gear box, and the addition of brakes. A user can only electronically change the position of the window when the automated sliding panel mechanism is engaged—by means of a controller, such as smart device running an app, or electric buttons on the gear assembly 14 (seen in FIG. 3A). In contrast, FIG. 4B illustrates an automated sliding panel mechanism in a released position 41, such that the gear box 25 and gear 21 are moved along the axis of the gear 21 and the third magnet 42 is now connected to the first magnet 22. As a user lifts the manual release mechanism plate 20, the third magnet 42 detaches from the second magnet 23, then, as the user continues to lift the manual release mechanism plate 20, the third magnet 42 eventually is brought near enough to the first magnet 22 that they attract one another. In this released position 41, a user can open and close their siding window 2 freely because the gear 21 is disengaged from the rack 3. In FIGS. 4A and 4B, the front housing 30, or stationary part of the holding mechanism, includes the first and second magnet. In another example the front housing 30, or stationary part of the holding mechanism comprises only one magnet, and the carriage 24 of the manual release mechanism 4 comprises two magnets.

Figure 5A:
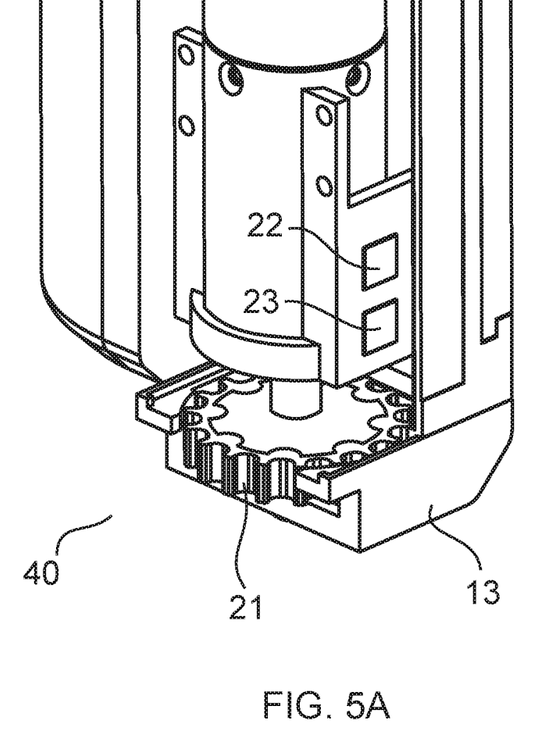
FIG. 5A is a perspective view of the gear assembly, holding mechanism, and detached front housing.
Figure 5B:
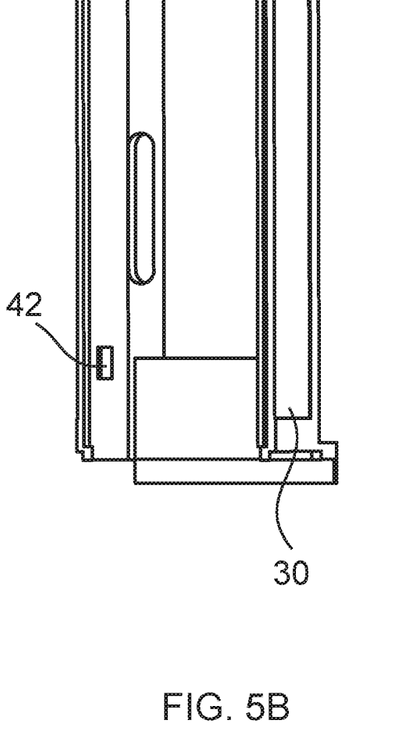
FIG. 5B is a perspective view of the front housing of the gear assembly, detached from the gear assembly, comprising one magnet.

FIG. 5A depicts the inner workings of the gear assembly 14, wherein the automated sliding panel mechanism is in an engaged position 40. In this embodiment, the carriage 24 of the manual release mechanism 4 comprises a first magnet 22 and second magnet 23. FIG. 5B shows the front housing 30 of the holding mechanism and comprises the third magnet 42.

Figure 5C:
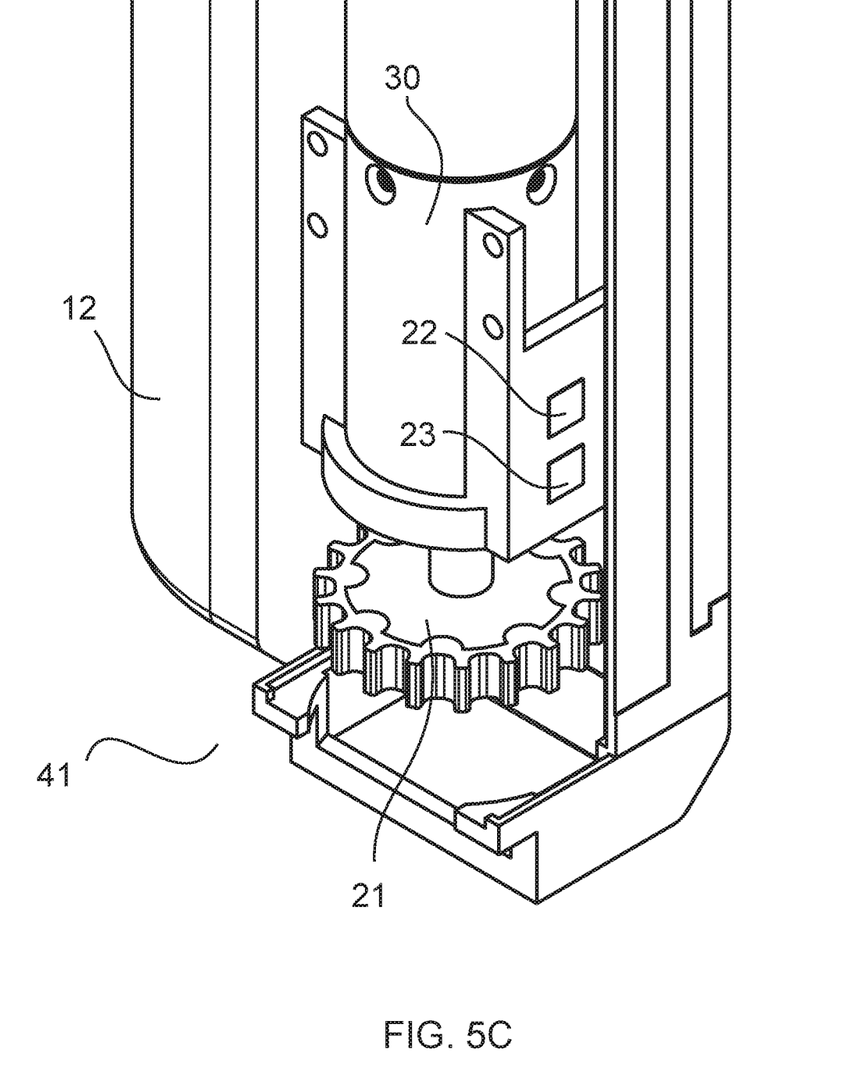
FIG. 5C is a perspective view of the gear assembly in a released position.

FIG. 5C illustrates the motor 26, gear box 31, and gear 21 raised along the axis of the gear 21, such that the automated sliding panel mechanism is in a released position 41.

Figure 6:
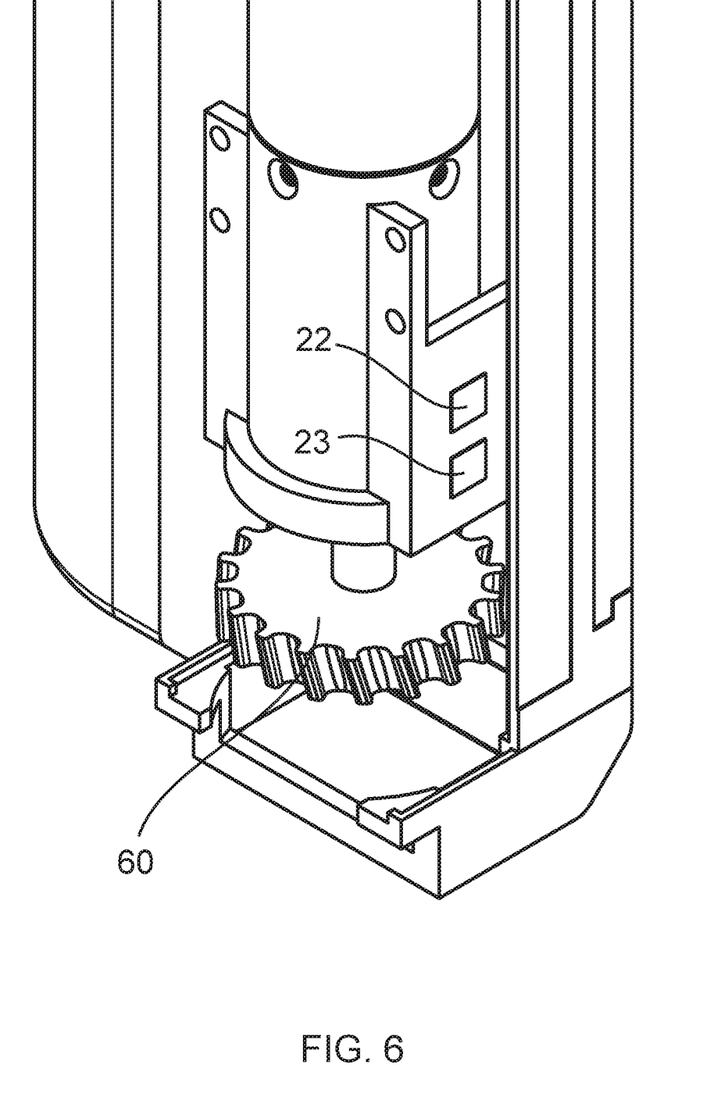
FIG. 6 is a perspective view of the gear assembly with a helical gear.

FIG. 6 depicts the automated siding panel mechanism with a helical gear 60, and two magnets attached to the carriage 24. Alternatively, the gear is a helical gear and two magnets of the holding mechanism are attached to the carriage.

Figure 7:
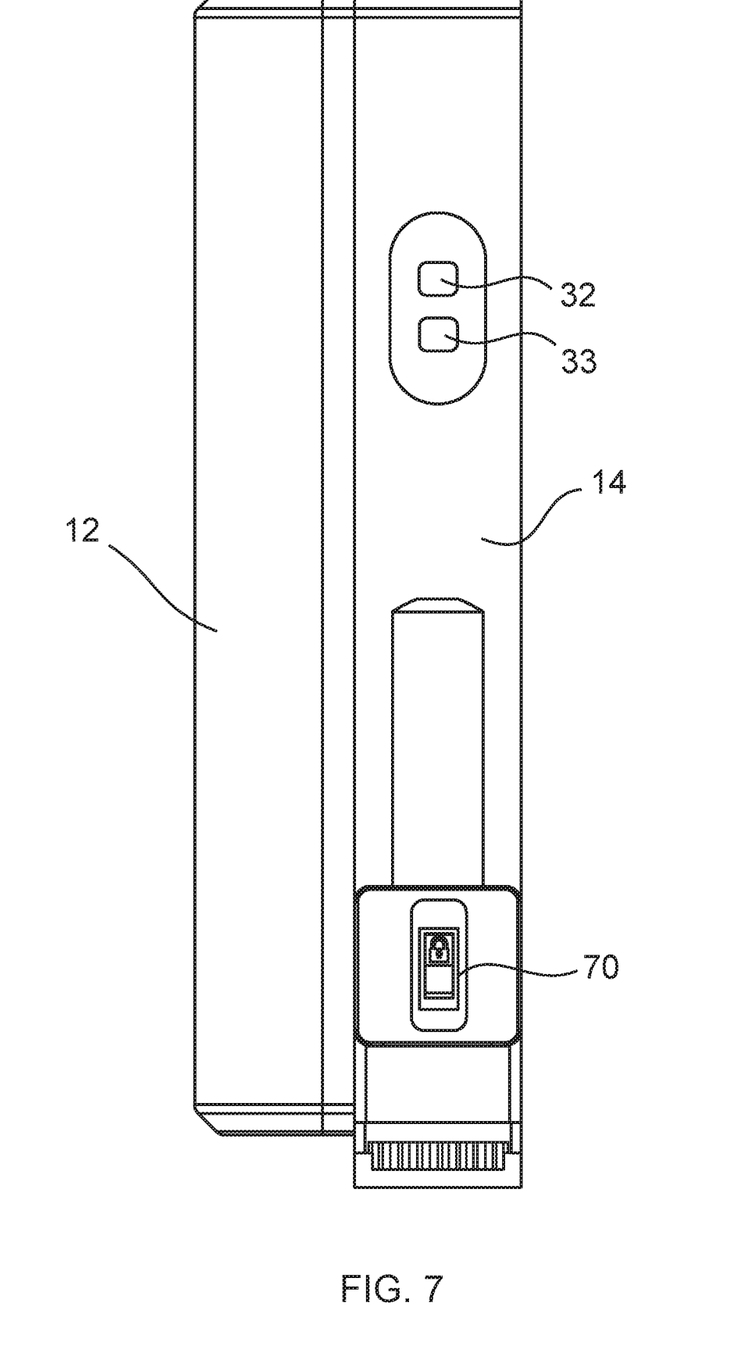
FIG. 7 is a front view of the automated sliding panel mechanism with a lever.

FIG. 7 depicts a front view of the automated sliding panel mechanism, wherein the manual release mechanism is a lever 70 with indicia. In another embodiment, the lever 70 has no indicia.

The rack 3 may be attached to the sliding window 2 several ways. These include, but are not limited to: adhesive applied to the side of the of the rack without teeth, (a peel and stick option, putty, or glue), fastening devices such as nails or screws, or slide-on-track that rests on a horizontal member with the teeth on one side and the other side being smooth. In another example, the rack 3 is attached to the sliding window 2 with double-faced tape. Tape allows users to remove the automated sliding panel mechanism from their sliding window 2 with relative ease. Alternatively, users attach the rack 3 to the sliding window 2 with glue dots, pressure sensitive adhesives, epoxies, adhesive sheets. In another embodiment, the rack is molded into a first or second horizontal member. Similarly, the gear assembly is attached to a component of the sliding window 2, such as the stationary component 6 with an adhesive or fastening devices.

In one embodiment, the automated sliding panel mechanism is controlled by a controller. In a preferred embodiment, the controller is a smart phone running an app. This allows users to control the degree to which their window is opened from a distance by using their phone. In one embodiment, the app allows users to save preferences. For example, a user determines that they prefer the window to be half-way open from 6:00 am to 9:00 am, and then closed from 9:01 am to 7:00 pm. At 7:00 pm, the user prefers that the window is fully open until 11:00 pm. In a preferred embodiment, the app stores this information and opens and closes the sliding window 2 according to a user's preferences. In another embodiment, the automated sliding panel mechanism saves users' preferences regarding to what degree the window should be open, for how long, and at what time of day, and that these patterns are different for different seasons. For example, a user prefers that in the winter time, a sliding window 2 with the automated sliding panel mechanism 1 is half way open for one hour a day starting at noon. However, in the springtime, the same user prefers that the sliding window 2 is fully open for two hours in the morning beginning at 8:00 am, and two hours in the evening beginning at 5:00 pm. Additionally, the same user prefers that in the summer, the sliding window 2 is fully opened for three hours beginning at 5:00 am, and fully opened for another three hours beginning at 8:00 pm. These seasonal preferences are stored in the smart phone running the app and are set to automatically shift at the arrival of a new season. In another embodiment, however, a user sets the exact date that they want their patterns to change.

In one embodiment, the motor is powered by a battery. In certain embodiments, the batteries are rechargeable batteries and powered by a solar panel.

Furthermore, in a preferred embodiment, the automated sliding panel mechanism includes a moisture sensor placed outside the window for detecting moisture. When moisture is detected at or near the window to which the automated sliding panel mechanism is attached, the processor overrides any pre-programmed preferences to open the window. And, wherein a window is open, and the moisture sensor senses moisture, the window will close. There are many instances in which this feature may be helpful. For example, a user may have programmed their preferences such that during the month of July, windows should open whenever there is a draft, so long as the outside temperature is below 75 degrees and above 60 degrees. However, if there is a summer thunderstorm, perhaps when a user is not in the building wherein the automated sliding panel mechanism is located, water could enter the building. Or, in another example, a sprinkler is running during the night, and a user has programmed their preferences such that their windows should remain open from 8 pm until 8 am. Upon sensing moisture, the moisture sensor would close the window, overriding the user's preferences to protect the inside of the building from water damage. When the automated sliding panel mechanism senses moisture and overrides the user's pre-programmed preferences, the user will receive a notification via the controller, preferably a smart phone, that their preferences are being overridden. At that time, a user can indicate to the automated sliding panel mechanism that it should not override their pre-programmed preferences if that is what the user prefers. Due to the placement of automated windows at or near windows, an automated window in accordance with the invention may also advantageously include security sensors to monitor security at or near a window. In one embodiment, the security sensor is a proximity sensor configured to detect opening and/or closing of a window or door. In another embodiment, the security sensor is an impact sensor configured to detect impacts on and/or breakage of a window. For example, an accelerometer may act as an impact sensor to detect an extent of force on a window. Different alerts or notifications may be sent to a user or other entity depending on the extent of the impact. For example, touching a window may trigger a low priority alert or notification. Larger forces (causing a window to break, for example) may trigger higher priority alerts or notifications. In some embodiments, high priority alerts may be configured to trigger gathering of camera footage at or near a window.

In another embodiment, the security sensor is a camera configured to gather video or still shots at or around a window. In certain embodiments, an LED or other lighting may be provided for recording video or still shots in low lighting conditions. The video or still shots may be streamed wirelessly to a centralized security system or stored on a motorized gearbox assembly for later retrieval. In other embodiments, the security sensor is a motion sensor configured to detect motion at or around a window. In yet other embodiments, the security sensor is an audio sensor configured to collect audio at or around a window. By incorporating security sensors into automated windows, security may be monitored at each window. In certain embodiments, information from the security sensors is relayed to a centralized security system. In other embodiments, an automated window in accordance with the invention may be configured to act as a centralized security system by gathering information from security sensors located at various automated windows. Such a centralized security system may, in certain embodiments, send notifications to a user, smart device, security company, law enforcement office, or the like, when breaches of security are detected.

The sensors may also, in certain embodiments, include safety sensors such as smoke detectors, carbon monoxide sensors, or the like. Outfitting automated windows with such sensors may provide a large number of sensors at prime locations throughout a home or business, while at the same time eliminating or reducing the need to equip a home or business with separate independent sensors. In certain embodiments, alerts or notifications may be sent to a user or first responder when smoke, carbon monoxide, or other critical substances or gases have been detected.

A current/voltage sensor may be provided to sense current or voltage associated with the motors or actuators. In certain embodiments, this information may be used to ensure that a motor or actuator is not overloaded. The current/voltage may also be used to calibrate the automated window. For example, when the automated window is fully closed (i.e., have reached their maximum position), the current of the motor or actuator may spike in response to their non-movement. This spike in current may indicate that a maximum position has been reached. The position of the window may be recorded at this point (using the position encoder) to remember the maximum position. The automated window may then be moved in the opposite direction until they stop (i.e., reach their minimum or fully open position). The current of the motor or actuator may again spike in response to the non-movement of the window. This spike may indicate that a minimum position has been reached. The minimum position may be recorded. In this way, the current/voltage sensor may be used in conjunction with the position encoder to learn the range of motion and stopping points of the motorized window. In certain embodiments, this calibration technique may be performed when the automated window is initially powered up or installed. Once the calibration is performed, the motorized window may, through various calculations, move the window to any desired position between the stopping points. The current/voltage sensor may, along with the position encoder, be used to estimate a size of an automated window. Knowing the size of the automated window may be used to prevent over-torqueing of the motorized window mechanisms.

An automated window in accordance with the invention may also be configured to interface with external sensors. Although various sensors (as previously discussed) may be located in the automated window or in close proximity to the automated window, other sensors may be located external to the automated window and, in some cases, be far removed from the automated window. For example, a temperature sensor located in one part of a building may be used to trigger operation of automated windows in other parts of the building. In other cases, readings from multiple sensors located throughout a building may be used to influence operation of an automated window or a group of automated windows. In certain cases, data may be gathered from external sensors and wirelessly communicated to an automated window or group of automated windows.

As previously mentioned, an automated window or group of automated windows in accordance with the invention may also be controlled (e.g., wirelessly controlled) by external switches, such as a remote control or a specialized wall switch. These switches may provide additional mechanisms for controlling an automated window or group of automated windows. In certain cases, a wall switch or remote control may provide a faster and more convenient way to control an automated window or group of automated windows than an application. In certain embodiments, an external switch in accordance with the invention may provide functionality to control devices other than automated windows.

In some embodiments, the frame has a latching device that mates to a latching receiver attached to the sliding component 10, wherein mating prevents movement of the sliding component. In some embodiments, the latching receiver comprises a communication device that generates a signal when the latching device is mated and transmits that signal to the motor, wherein the signal deactivates the motor.

In an embodiment, the controller sends control signals to the device to operate in such a way to assure the safety of occupants in the building wherein the automated sliding panel mechanism is located. For example, CO detectors or smoke detectors may open windows upon detection of noxious gases. Ventilation fans at or near the window opening may also be turned on to actively promote the ventilation of these gases. Other safety embodiments include closing all windows when air quality alerts indicate that exterior air is not healthy (red zone). This info may be relayed to the controller via the cloud-based network or from sensors. In an embodiment, the controller may close all windows when high winds are in the area. This info may be determined by exterior sensors or weather reports via a cloud-based network.

In an energy embodiment, the controller may tie in with the building HVAC system in order to allow the HVAC system to open windows to let in cool air when the interior space is too hot. This allows the HVAC system to operate in an economizer mode when outdoor air temperature is cool so that the air conditioner does not have to be operated. This saves energy. Temperature sensors inside the building and outside of the building inform the controller. The fan of the HVAC system may be activated to draw air in through the open window (creating a negative air pressure within the building).

In an embodiment, exterior humidity or moisture sensors may inform the controller that rain or a water from sprinkler system is near a window opening. The controller may then close windows that are open that may be impacted by the water intrusion. Weather reports from an online service may also inform the controller to enable this operation.

In another embodiment, sensors may be located inside or outside of the building at locations near the window or far away. These sensors may inform the controller regarding conditions that impact the operation of the device. For example, temperatures at or near the window may be different than the outdoor temperature or the temperature in other parts of the building. Decisions regarding the opening and closing of a window may depend on not only the temperature at the window, but also other locations inside and outside of the building.

A light sensor may sense light levels at or around a window. Various types of light sensors, including photovoltaic cells, cameras, photo diodes, proximity light sensor, or the like, may be used depending on the application. In an embodiment, the solar panel may be used as a light sensor. In certain embodiments, a light sensor may sense light external to a window. This may allow an automated window to open or close or increase and decrease opacity in response to lighting conditions outside a building. For example, an automated window may be configured to open at sunrise and close at sunset. Alternatively, or additionally, an automated window may be configured to open (either fully or partially) when conditions are overcast, thereby letting more light into a room or space, and close (either fully or partially) in response to detecting full sunlight, thereby letting less light into a room or space. In certain embodiments, a light sensor may be used to determine a total amount of light energy entering a room or space through a window. This information may be used to adjust an automated window or to adjust HVAC system parameters. In another embodiment, the window may be closed upon detection of water or moisture from an environmental sensor.

A light sensor may also be configured to sense light levels internal to a window, such as within a room or interior space. This may allow an automated window to be adjusted based on interior light levels. For example, an automated window may be opened in response to lower levels of interior light and closed in response to higher levels of interior light. In certain embodiments, various algorithms may be used to adjust automated windows in response to both exterior and interior light levels, as opposed to just one or the other. Thus, in certain embodiments light sensors may be provided to sense both exterior and interior light levels.

In certain embodiments, the opening and closing of automated windows may be coordinated with the turning on or off of lights in a room or space. For example, if lights in a room are turned off, automated windows may be opened to compensate for the reduced amount of light. This allows natural light to replace artificial light and creates opportunities for conserving energy. In certain embodiments, lights may be automatically turned off and automated windows may be automatically opened to replace artificial light with natural light when conditions allow. In such embodiments, the automated windows and interior lighting may be controlled by a home automation platform or other controller to provide desired amounts of light in a room or space while simultaneously conserving energy.

All patents and published patent applications referred to herein are incorporated herein by reference. The invention has been described with reference to various specific and preferred embodiments and techniques. Nevertheless, it understood that many variations and modifications may be made while remaining within the spirit and scope of the invention.

What is claimed is:

1. A mechanism coupling a sliding panel to a frame, wherein the sliding panel moves within the frame between an open position and a closed position, the mechanism comprising:
   a motor configured to move the sliding panel between the closed position and the open position,
   a power source, providing power to the motor,
   a rack comprising a base with rack teeth extending from a plane thereof;
   a gear rotated by the motor about a gear axis of rotation, the gear comprising gear teeth shaped to mesh with the rack teeth;
   a manual release mechanism configured to move the gear along the gear axis of rotation, from an engaged position, wherein the gear teeth mesh with the rack teeth, to a released position, wherein the gear teeth are disengaged from the rack teeth; and
   a holding mechanism adapted to hold the gear in the engaged position and in the released position as selected by a user;
   wherein the motor is coupled to one of the sliding panel and the frame and the rack is attached to the other of the sliding panel and the frame, wherein operation of the motor causes the sliding panel to move relative to the frame.

2. The invention of claim 1, wherein the holding mechanism comprises a first and a second magnet mounted on the holding mechanism and a third magnet mounted on the manual release mechanism, wherein, when the third magnet is brought sufficiently close to the first magnet to magnetically attract the first magnet, the holding mechanism holds the gear in the engaged position and wherein, when the third magnet is brought sufficiently close to the second magnet to magnetically attract the second magnet, the holding mechanism holds the gear in the released position.

3. The invention of claim 1, wherein the holding mechanism comprises a first and a second magnet mounted on the manual release mechanism and a third magnet mounted on a stationary part of the holding mechanism, wherein, when the first magnet is brought sufficiently close to the third magnet to magnetically attract the third magnet, the holding mechanism holds the gear in the engaged position and wherein, when the second magnet is brought sufficiently close to the third magnet to magnetically attract the third magnet, the holding mechanism holds the gear in the released position.

4. The invention of claim 1, further comprising gearing between the motor and the gear, and wherein the gearing is configured to prevent rotation of the gear when not driven by the motor.

5. The invention of claim 1, further comprising a brake to prevent the gear from rotating and thereby lock the sliding panel when the manual release mechanism is in the engaged position except by rotation of the gear by the motor.

6. The invention of claim 1, wherein the manual release mechanism comprises a surface which is moved by a user to move the automated sliding panel mechanism between the engaged position and the released position.

7. The invention of claim 6, wherein the manual release mechanism surface comprises indicia which indicates in which direction to move the manual release mechanism to achieve the engaged position and which direction to move the manual release mechanism to achieve the released position.

8. The invention of claim 6, wherein the manual release mechanism surface and manual release mechanism carriage are one piece.

9. The invention of claim 1, wherein the manual release mechanism surface is a lever which is moved by a user to move the manual release mechanism between an engaged position and a released position.

10. The invention of claim 1, wherein the manual release mechanism comprises a carriage.

11. The invention of claim 1, wherein the gear is a helical gear.

12. The invention of claim 1, wherein the gear is a spur gear.

13. The invention of claim 1, wherein the sliding panel is a window or a door.

14. The invention of claim 1, wherein the power source is a solar panel.

15. A mechanism coupling a sliding panel to a stationary component, the mechanism comprising:
   a motor configured to move the sliding panel between a closed position and an open position relative to the stationary component;
   a power source, providing power to the motor;
   a rack comprising a base with rack teeth extending from a plane thereof;
   a gear rotated by the motor around an axis of rotation, the gear comprising gear teeth shaped to mesh with the rack teeth;
   a manual release mechanism adapted to move the gear along the axis of rotation, from an engaged position, wherein the gear teeth mesh with the rack teeth to a released position, wherein the gear teeth are disengaged from the rack teeth; and
   a holding mechanism adapted to hold the gear in the engaged position and in the released position, wherein the holding mechanism comprises a first magnet, second magnet, and third magnet mounted on the holding mechanism, wherein, when the third magnet is brought sufficiently close to the first magnet to magnetically attract the first magnet, the holding mechanism holds the gear in the engaged position and wherein, when the third magnet is brought sufficiently close to the second magnet to magnetically attract the second magnet, the holding mechanism holds the gear in the released position.

16. The invention of claim 15, further comprising gearing between the motor and the gear, and wherein the gearing is configured to prevent rotation of the gear when not driven by the motor.

17. The invention of claim 15, further comprising a brake to prevent the gear from rotating and thereby lock the sliding panel when the manual release mechanism is in the engaged position except by rotation of the gear by the motor.

18. The invention of claim 15, wherein the magnets are permanent magnets.

19. The invention of claim 15, wherein the manual release mechanism further comprises a carriage.

20. The invention of claim 15, wherein the manual release mechanism comprises a surface which is moved to move the automated sliding panel mechanism between an engaged position and a released position.

* * * * *